Nov. 6, 1962 J. D. MOOSE ETAL 3,062,464

MAGNETIC TAPE TRANSPORT MECHANISM

Filed Aug. 12, 1960

2 Sheets-Sheet 1

JOE D. MOOSE &
HARVEY H. McCOWEN
INVENTORS

BY Harvey J. Lowhurst

ATTORNEYS

JOE D. MOOSE &
HARVEY H. McCOWEN
INVENTORS

BY Harvey J. Lawbaugh
ATTORNEY

United States Patent Office 3,062,464

Patented Nov. 6, 1962

3,062,464

MAGNETIC TAPE TRANSPORT MECHANISM

Joe D. Moose and Harvey H. McCowen, Los Altos, Calif., assignors to Ampex Corporation, Redwood City, Calif., a corporation of California Filed Aug. 12, 1960, Ser. No. 49,374
2 Claims. (Cl. 242—55.12)

This invention relates to tape transport mechanisms and, more particularly, to tape transport mechanisms suitable for use in feeding magnetic tape through tape recording-reproducing machines.

At the present time, magnetic tape recording machines are used in many applications in which the magnetic tape must move through a head assembly intermittently, but at very high rates of speed. For such movement, the tape must be rapidly accelerated in the head assembly from a static condition to normal operating speed in a minimum amount of time, and decelerated correspondingly. In addition, the tape must be moved through the head assembly at a uniform velocity. Both requirements may be satisfied by providing separate power drives and brakes for the tape supply reel, the tape takeup reel and at the head assembly, thus permitting each part of the tape to be driven or braked without imposing any loads on other parts of the tape. With this arrangement, however, the various parts of the tape have to be accelerated, braked or driven identically so that differences in velocity do not cause mechanical interference which damages or breaks the tape.

In order to prevent such mechanical interferences and to insure the desired amount of tension in the tape, it has been customary to provide a loop of slack tape between the drives. The loop is normally formed in a pneumatic chamber so as to divide the chamber into a high pressure portion and a low pressure portion. The pressure differential which exists across the tape insures proper shaping of the loop and maintenance of the prescribed tension. The tape may therefore be started and stopped very rapidly in the region of the head assembly, while the tape supply and takeup reels are moved intermittently and with different rates of acceleration. By sensing the length of slack loop, such systems operate the supply and takeup reels so as to maintain the slack loops within predetermined limits.

During normal operation of the tape transport mechanism, the air pressure may tend to force the tape in the slack loop against the walls of the pneumatic chamber. When the tape is fed through the head assembly, lengths of the tape slide across surfaces of the chamber at very high rates of speed. As a result of this contact and sliding motion, substantial static electric charges accumulate on the tape and on the surfaces of the pneumatic chamber. These charges may become sufficiently large to cause the tape to adhere to the walls with sufficient force to impede the movement of the tape or actually to cause the tape to break.

It is therefore an object of the present invention to provide an improved magnetic tape transport mechanism having improved reliability over systems of the prior art.

Another object of the present invention is to provide a magnetic tape transport mechanism utilizing a pneumatic chamber in which the tape is not subjected to electrostatic forces.

In accordance with the present invention, a tape transport mechanism is provided in which the advantages of pneumatic chamber operation are obtained together with freedom from interference because of the accumulation of static electric charges. To this end, interior surfaces of the pneumatic chamber with which the tape comes in contact are provided with a layer of a semi-conductive material. The semi-conductive material provides a leakage resistance which both limits the tendency of charges to build up and drains off charges which might accumulate.

In one specific arrangement in accordance with the invention, the semi-conductive material is a poor insulator in the form of a paint of the type which acquires a rough exterior surface, or crackle finish, during drying. The paint and the rough surface are effective to reduce the accumulation of an electrostatic charge by permitting the migration of the charge. Charges which are built up on the tape and the semi-conductive material are found to have like polarity, so as to cause a mutual repulsion between the tape and the layer, thus further reducing frictional contact and adhesive forces.

A better understanding of the invention may be had by reference to the following description, taken in conjunction with the accompanying drawing, in which.

Figure 1:
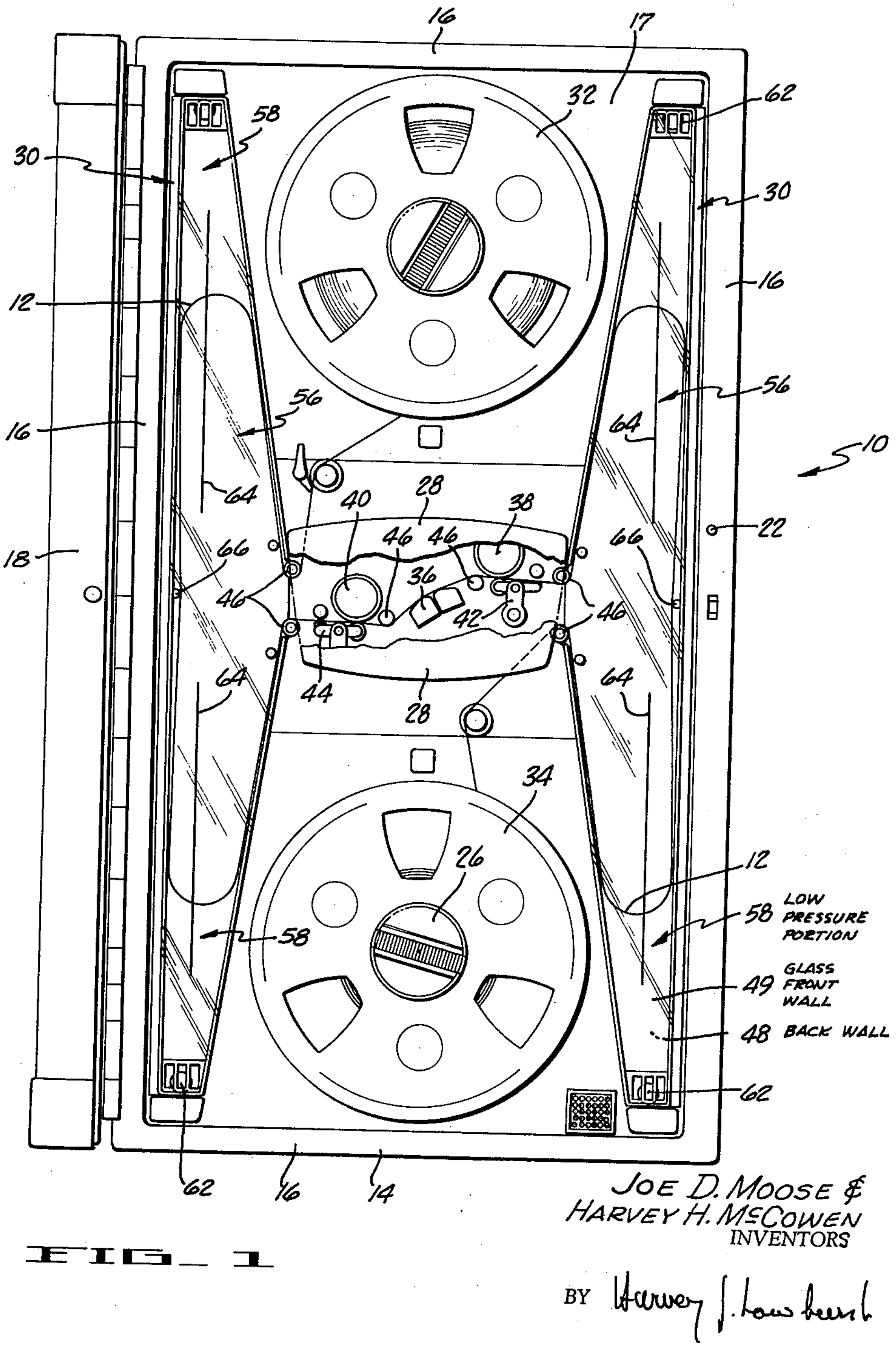
FIGURE 1 is a front view, partially broken away, of a magnetic tape transport mechanism employing pneumatic chambers in accordance with the present invention.
Figures 2, 3:
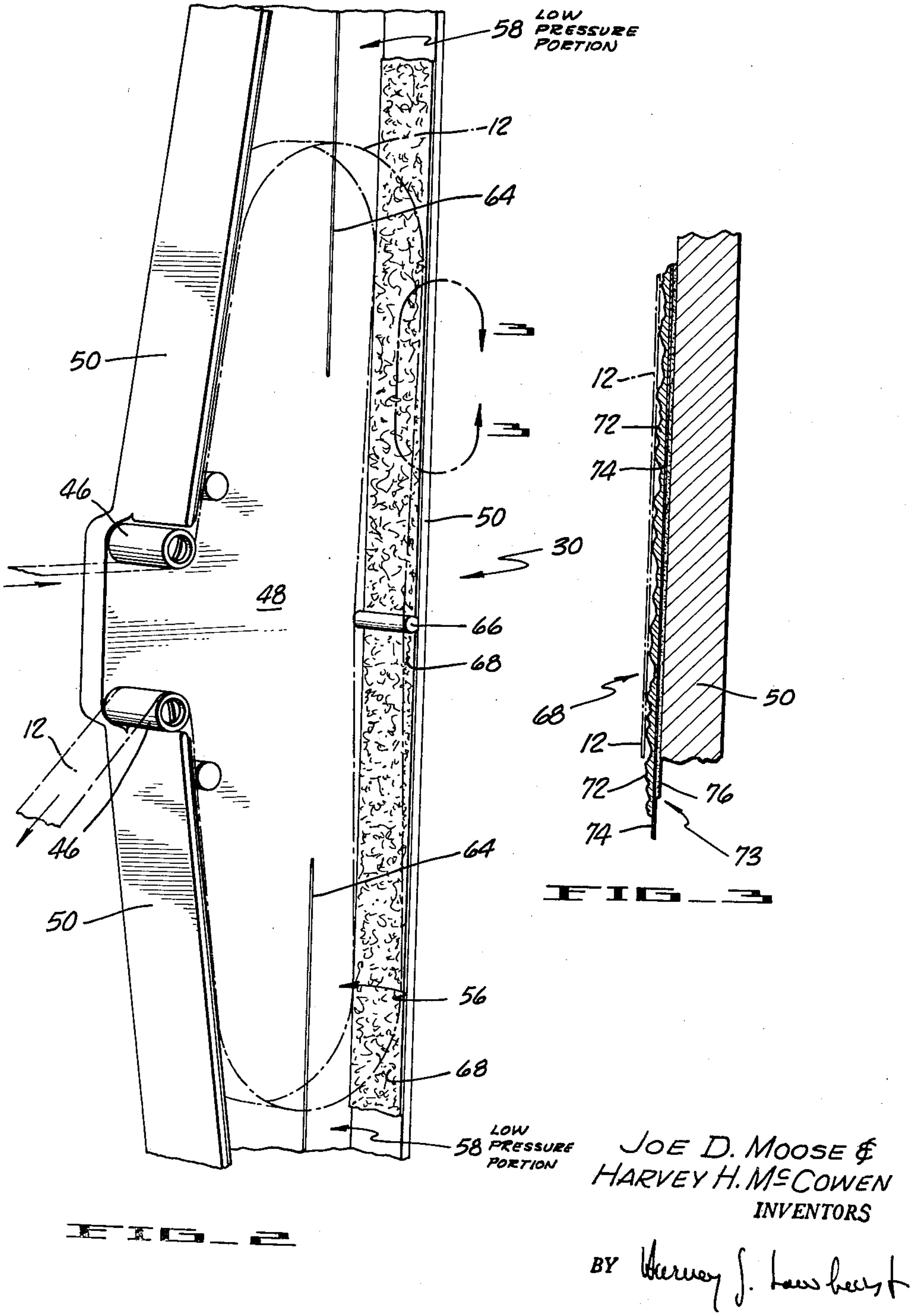
FIGURE 2 is an enlarged perspective view of a part of one of the pneumatic chambers of the arrangement of FIGURE 1.
FIGURE 3 is a fragmentary sectional view, taken along the line 3—3 in FIGURE 2 showing in enlarged form the relationship of the magnetic tape to the side walls of the pneumatic chamber.

Referring now to FIGURES 1 and 2 in detail, the present invention is shown as used in a high speed magnetic tape recording-reproducing mechanism 10. The tape mechanism 10 may be used for any suitable purpose, such as a high speed digital computer memory. For such applications, the tape mechanism 10 must move a tape 12 at high rates of speed but with acceleration or deceleration between normal operating speeds and a stationary condition in extremely short time intervals.

More particularly, the tape mechanism 10 includes a housing 14 having a center section that is surrounded by side walls 16 so as to form a recessed face 17 upon which various working elements of the tape mechanism 10 may be mounted. A cover door 18 which is hinged on one of the side walls 16 and secured to the opposite wall 16 by a latch 20 provides an enclosed chamber, and protects the various working parts. In addition, a suitable safety interlock 22 may be provided to prevent operation of the elements when there might be a danger to the operator.

The tape mechanism 10 includes a supply reel drive hub 24, a takeup reel drive hub 26, a capstan and transducer unit 28 located approximately half way between the hubs 24 and 26, and a pair of tape tensioning air columns 30 that extend along the opposite sides of the face 17. During operation the opposite ends of the tape 12 are wound on reels 32, 34 mounted on the supply and takeup hubs 24, 26, respectively. Between the reels 32, 34 the tape 12 is fed successively through a tape tensioning column 30, the capstan and transducer unit 28 and then through the other tape tensioning column 30.

The capstan and transducer unit 28 includes a magnetic head assembly 36, a forward drive capstan 38, a reverse drive capstan 40, and a pair of pinch roller assemblies 42 and 44 having tape brakes. The magnetic head assembly 36 includes magnetic transducers (not shown in detail) which magnetize the tape 12 so as to record signal patterns in response to electrical current flow from associated circuits (not shown) and may respond to the magnetization on the tape to produce an electrical current indicative of the recorded information. The forward and reverse drive capstans 38, 40 are located on the opposite sides of the head assembly 36, to pull the tape 12 through the head assembly in forward and reverse travel, respectively. The capstans 38, 40 are driven from an independent power source so that they may rotate independent of the rest of the working elements. Tape guides 46 hold the tape 12 in position along the reverse drive capstan 40, the magnetic head assembly 36 and forward drive capstan 38. The pinch roller assemblies 42, 44 may, by a very short deviation in position, cause the tape 12 to engage a selected one of the capstans 38, 40 or an associated braking element.

Because of the presence of slack loops in the tape tensioning columns 30, only the length of tape which is in the capstan and transducer unit 28 is accelerated or decelerated. Thus only a very small inertia is involved and the tape 12 is handled very gently even though it is accelerated or decelerated very rapidly. In contrast, large masses and high inertia are presented by the supply and takeup reels 32, 34 with the lengths of coiled tape 12. Although the tape 12 may be started and stopped at the capstan and transducer unit 28 in times of the order of a millisecond, movement of the reels 32, 34 and the tape 12, which is coiled on them, requires a considerably longer time interval for both starting and stopping.

In order to prevent binding of the tape 12 between the supply and takeup reels 32, 34 and the capstan and transducer unit 28, the intermediate lengths of tape 12 are arranged in slack loops, which are variable in length. The variations in length are effected in the tape tensioning columns 30, each of which include a pair of parallel side walls 48, 49 and a plurality of end walls 50 which together form a pneumatic chamber 52. The back side wall 48 lies in the same plane as the recessed face 17, and the front side wall 49 is shown as glass. Adjacent the capstan and transducer unit 28, the end walls 50 include an opening 54 to which the tape 12 may enter and leave the tensioning column 30 so as to form a loop of slack tape in the chamber 52. The back and front side walls 48, 49 are spaced apart by approximately the width of the tape 12, so that there is only a nominal clearance and little air leakage when the tape 12 is disposed between and substantially normal to the side walls 48, 49. The slack loop of tape 12 thus divides the pneumatic chamber 52 into two separate, relatively high atmospheric and low pressure portions 56 and 58, respectively. Both tape tensioning columns 30 are alike in these respects.

In order to control the shape of the loop of tape 12 in the chamber 52, air is exhausted through ports 62 located at the ends of the pneumatic chamber 52. With little air leakage between the edges of the tape 12 and the side walls 48, a pressure differential is created across the tape 12. This pressure differential forces the tape 12 outwardly through the chamber 52, so that the loop of tape 12 contains all of the slack between a reel 32 or 34 and the capstan and transducer unit 28. Although the tape 12 in the loop may be entering through the opening 54, circulating through the chamber 52, and leaving through the opening 54, the tension in the tape 12 is a function of the force holding the tape 12 in a loop. This force remains essentially the same, because it is determined primarily by the pressure differential across the tape 12, which pressure differential is substantially constant, despite the size of the loop and the speed of movement of the tape 12.

When the speed at which the tape 12 is winding onto or unwinding from the reels 32, 34 is different than the speed at which the tape 12 is traveling through the capstan and transducer unit 28, the size of the loop increases or decreases. A pressure sensitive pickup device, including slots 64 which extend along the back side wall 48 of the chamber 52, sense the dividing line between the atmospheric and low pressure portions 56 and 58. When the loop is of a desired size, air flow from the high and low pressure portions produces a predetermined pressure in a sensing device coupled to the slots 64. If the loop becomes too big or too small the tape 12 moves across the slots 64 and increases or decreases the pressure in the associated sensing device. The sensing device then provides a signal for a proportional servo control (not shown) which causes the reels 32, 34 to be driven slower or faster until the length of the loop is within predetermined limits.

As the tape 12 travels through the pneumatic chamber 52 the air pressure in the atmospheric pressure portion 56 forces the tape 12 laterally in opposite directions into frictional contact with the end walls 50 of the pneumatic chamber 52. Accordingly, as the tape 12 is fed into, through and out of the tape tensioning column 30 the tape 12 which forms the loop slides along various parts of the end walls 50 at a high rate of speed. Some of the frictional contact is reduced through the presence of a polished bearing element 66 at a point in the chamber 52 opposite the opening 54. Nonetheless, a relative sliding movement between the two frictional surfaces tends to generate an appreciable static electric charge. Prior to the present invention, this static electric charge could accumulate and become of such magnitude as to cause the tape 12 in the loop to be attracted to the end walls 50 with sufficient force to cause the tape 12 to break when driven by the capstan and transducer unit 28. A more frequent difficulty, in prior art devices, was a tendency of the tape 12 to bunch and tangle in the vicinity of the opening 54 when driven from the capstan and transducer unit 28 into the tape tensioning column 30.

In accordance with the present invention, the inside surfaces of the end walls 50 of the pneumatic chamber 52 against which the tape comes in contact are provided with a semi-conductive surface 68 (see FIGURE 2 particularly). The semi-conductive surface 68 provides an electrical leakage resistance which permits the migration of electrons, although the migration rate is limited. Because of this property, electrostatic charges build up slowly on the surfaces of the end walls 50. Charges which do accumulate tend to drain off because of the migration of electrons, thus providing added assurance of freedom from excessive attraction during normal operation.

A preferred example in accordance with the present invention, referring now to FIGURE 3, employs a layer 72 of paint which acquires an irregular surface as it dries. Such paint operates as a semi-conductive material because it acts as a poor electrical insulator. It would appear that this property is due to the presence of metallic particles in the paint.

A number of further advantages are derived from the employment of what may be called a "crackle finish" paint layer 72 on the surfaces of the end walls 50. The irregular surface of the layer 72 limits the area of contact between the tape 12 and the layer 72, and reduces somewhat the tendency of electrostatic charges to accumulate. A further unexpected result is that with this type of layer 72 like charges build up on both the tape 12 and the layer 72. Consequently, an electrostatic force of repulsion is introduced, and the frictional contact of the tape 12 with the sides of the pneumatic chamber 52 is reduced.

Although the paint layer 72 may be applied directly to the surfaces of the end walls 50, it has been found preferable to employ a tape 73 consisting of a film 74 of flexible material having an adhesive backing 76 on one side and the semi-conductive layer 72 on the other side. Because the tape 73 may be prepared independently and placed wherever desired, as well as replaced if necessary, it will be seen that this preferred arrangement greatly facilitates the use and placement of the semiconductor layer.

Through the use of the semi-conductive layer 72, as shown in detail in FIGURE 3, tape transport mechanisms in accordance with the present invention are freed from the troublesome problem of electrostatic attraction between the tape 12 and the surfaces with which it comes in sliding contact. In many types of prior art vacuum column devices, the slack loop of tape is maintained out of contact with the side walls of the vacuum column. In the present arrangement, however, compactness and other advantages are derived through the central disposition of the capstan and transducer unit 28 relative to the adjacent tape tensioning columns 30. An important consideration is that the tape 12 is driven only on the non-recording surface, so as to minimize wear on and increase the life of the surface containing the magnetic oxide. With a compact tape transport mechanism of this type, therefore, contact with the side surfaces of the pneumatic chamber 52 is useful.

It has been found that tape transport mechanisms in accordance with this invention operate satisfactorily in continuous operation, but with intermittent stops and starts at the capstan and transducer assembly, without interference because of the accumulation of static electric charges. Start and stop times of 1.5 milliseconds and less are employed in one practical exemplification, without any tendency of the tape to bunch up at the critical juncture points at which it is ejected from the capstan and transducer mechanism into the tape tensioning columns.

The advantageous features heretofore discussed are apparently enhanced because of the presence of the large number of interstices between the projecting irregularities in the semi-conductive surface 68. The apexes of the irregularities, on which the tape 12 slides, are separated from each other by a substantial amount, thus drastically reducing the amount of forces produced by the static charges. Furthermore, the charges tend to migrate into the interstices and away from the layer 72, further minimizing the accumulation of charges.

It may be seen, therefore, that according to the present invention a tape transport mechanism is provided which permits extremely rapid starting and stopping of the tape, but which avoids restraint and breakage of the tape. The tendency of electrostatic forces to be generated, thus possibly impairing tape freedom, is minimized by antistatic means which do not interfere with normal tape movement.

What is claimed is:

1. An antistatic surface for permitting free sliding movement of a magnetic tape relative to a wall surface including an adhesive layer affixed to the wall, a backing film affixed to the adhesive layer, and a paint surface on the backing film, the paint surface having a ridged finish and being a poor insulator for preventing the accumulation of electrostatic charges.

2. A tape transport mechanism including the combination of a frame, spaced apart supply and takeup reels, a capstan and transducer unit positioned between the supply and capstan reels, and providing forward and reverse movement of the tape, a pair of tape tensioning columns positioned on opposite sides of the capstan and transducer unit, each of the tape tensioning columns defining a pneumatic chamber and including a central opening through which tape from the capstan and transducer unit may be fed and withdrawn, means coupled to the central openings of the tape tensioning columns for maintaining a pressure differential therein such as to force tape in the columns outwardly from the central region into a loop which comes in contact with walls of the tape tensioning columns, and means for limiting the accumulation of electrostatic charges on the walls of the tape tensioning columns due to relative sliding movement of the tape, said means including adhesive means affixed to the walls of the tape tensioning columns along which the tape slides, and a semiconductive paint layer having a ridged surface finish affixed to the adhesive for preventing the accumulation of electrostatic charges.

References Cited in the file of this patent

UNITED STATES PATENTS

| | | |
|---|---|---|
| 2,792,217 | Weidenhammer et al. | May 14, 1957 |
| 2,889,491 | MacDonald | June 2, 1959 |
| 2,990,990 | Wilkins et al. | July 4, 1961 |